United States Patent [19]

Dorrell

[11] Patent Number: 5,501,546
[45] Date of Patent: Mar. 26, 1996

[54] APPARATUS FOR DISSIPATING WAVE ENERGY

[76] Inventor: Donald E. Dorrell, Blackrock, Rarotonga 01, Cook Islands

[21] Appl. No.: 256,944

[22] PCT Filed: Feb. 24, 1993

[86] PCT No.: PCT/NZ93/00008

§ 371 Date: Jul. 27, 1994

§ 102(e) Date: Jul. 27, 1994

[87] PCT Pub. No.: WO93/17189

PCT Pub. Date: Sep. 2, 1993

[30] Foreign Application Priority Data

Feb. 26, 1992 [NZ] New Zealand ............ 241750

[51] Int. Cl.⁶ ............................................. E02B 3/04
[52] U.S. Cl. ................... 405/25; 405/33; 405/35
[58] Field of Search ................... 405/21, 25, 29, 405/33, 35

[56] References Cited

U.S. PATENT DOCUMENTS

| | | | |
|---|---|---|---|
| 3,380,253 | 4/1968 | Vita | 405/29 |
| 3,386,250 | 6/1968 | Katayama | 61/3 |
| 3,614,866 | 10/1971 | Kaneko et al. | 405/29 |
| 3,753,553 | 8/1973 | Bockting | 405/29 X |
| 4,129,006 | 12/1978 | Payne | 405/31 |
| 4,269,537 | 5/1982 | O'neill | 405/29 |
| 4,431,337 | 2/1984 | Iwasa | 405/21 X |
| 4,711,598 | 12/1987 | Schaaf et al. | 405/30 |
| 4,856,934 | 8/1989 | Nelson | 405/33 |
| 5,015,121 | 5/1991 | Perret-Gentil | 405/33 X |
| 5,123,780 | 6/1992 | Martinsen | 405/25 X |

FOREIGN PATENT DOCUMENTS

| | | |
|---|---|---|
| 403420 | 5/1970 | Australia . |
| 2528463 | 12/1983 | France . |

Primary Examiner—Roger J. Schoeppel
Attorney, Agent, or Firm—Young & Thompson

[57] ABSTRACT

A structure for dissipating the energy of waves impinging on a shore is disclosed which includes one or more rows of modules positioned adjacent the shore. Each module incorporates a number of vanes. The vanes are shaped and spaced so that a number of venturi passages are defined between the vanes. Each vane has a frontal portion which faces away from the shore, and is inclined from the vertical so that it slopes away from the shore to define an entrapment chamber which forces an oncoming wave to pass through the venturi passages rather than over the module or be reflected. The sides of the passages converge from front to back. A longitudinally extending hub causes the passages to converge also in the vertical direction. Each vane may be X-shaped and substantially symmetrical about a vertical plane through its center. The modules are cast from a cementitious material and may incorporate a number of vanes joined together at the hub which is located at the center of the X. The vanes may be joined together at their upper and lower ends by cross members. The passages may incorporate cross vanes which divide the passage into subpassages. Other vane shapes are disclosed. The vanes may be individually fabricated.

8 Claims, 8 Drawing Sheets

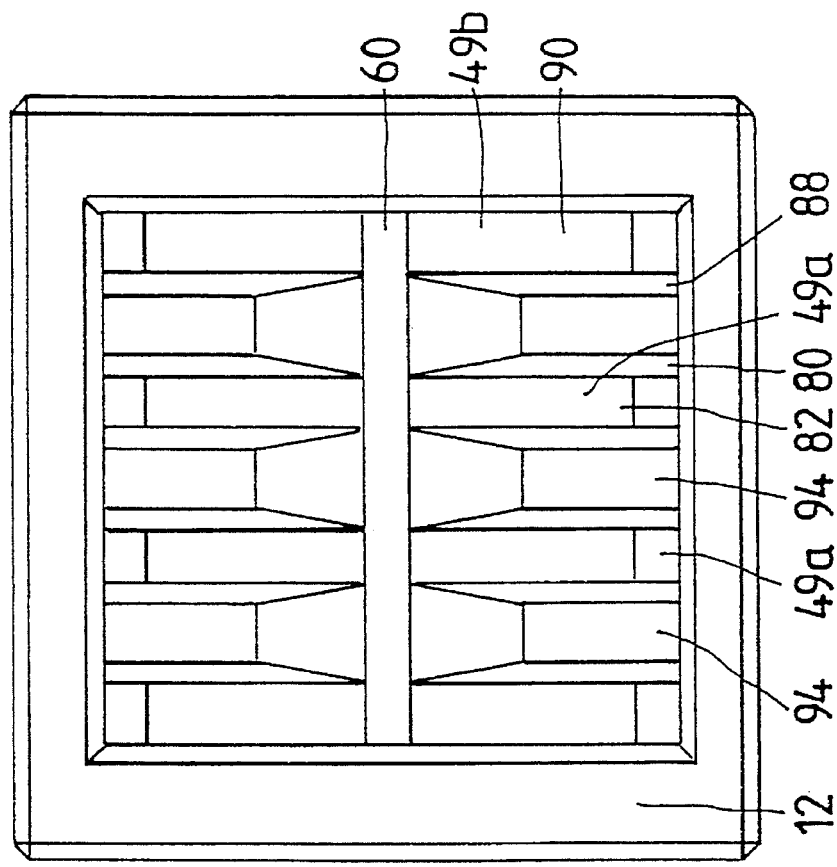
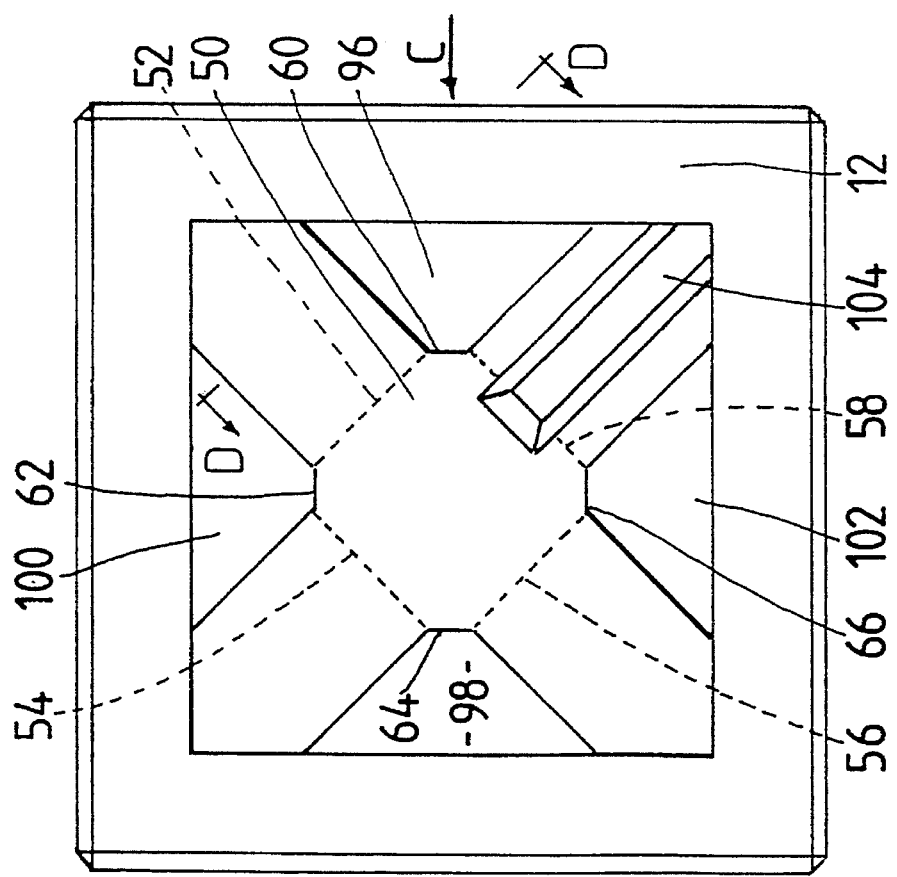

APPARATUS FOR DISSIPATING WAVE ENERGY

FIELD OF THE INVENTION

This invention relates to apparatus for dissipating the energy of waves in the sea or other body of water thereby bringing about a reduction in the heights of waves and wave field velocity as well as wave energy reflection.

DESCRIPTION OF PRIOR ART

Most of the work done in this field appears to have been directed at reducing erosion of beaches and shorelines. The present invention has been developed for the purpose of reducing the general damage caused along coastlines by the ocean during severe storms.

Considerable work has been done in these two related fields. Prior art known to the applicant includes U.S. Pat. Nos. 4,856,934 (Nelson), 4,431,337 (Iwasa), 4,269,537 (O'Neill), 4,711,598 (Schaaf), 4,129,006 (Payne), and 5,015,121 (Perret-Gentil) as well as the applicant's own European patent application #89.903981.2. All of these disclosures show constructions which present barriers of one kind or another which are wave permeable. It has become recognised that impermeable barriers often cause damage to adjacent shorelines and are moreover themselves susceptible to damage in severe storms.

SUMMARY OF THE INVENTION

According to the invention there is provided a structure for dissipating the energy of waves impinging on a shore, the structure comprising a number of similarly shaped, spaced apart vanes positioned in at least one row on the floor of a body of water adjacent the shore so that passages for the waves are defined between at least some pairs of adjacent vanes, each vane being characterised in having a frontal portion which faces away from the shore, at least a part of the frontal portion comprising a zone which is inclined from the vertical so that an upper end of the zone is located further from the shore than a lower end thereof.

In one aspect of the invention each vane has a back portion at least a part of which comprises a zone which faces the shore and which is inclined from the vertical so that an upper end of the zone is located further from the shore than a lower end thereof.

In one form of the invention the passage has an entrance which is at least partly bounded by the frontal portions of the vanes and an exit which is at least partly bounded by the back portions of the vanes, the back portions being wider than the front portions so that the passage is narrower at the entrance than at the exit. The passage may advantageously be provided with a cross wall having a surface which slopes upwardly from the entrance to the exit.

In one aspect of the invention the frontal portion comprises an upper zone which adjoins a lower zone, each of the zones being inclined from the vertical with the upper end of the upper zone and the lower end of the lower zone being further from the shore than the locality at which the zones adjoin.

In another aspect of the invention each vane has a back portion comprising an upper zone which adjoins a lower zone, each of the zones facing the shore and being inclined from the vertical with the upper end of the upper zone and the lower end of the lower zone being further from the shore than the locality at which the zones adjoin. Each vane may advantageously be substantially cruciform. It may furthermore advantageously be substantially symmetrical about a vertical plane through its centre.

In one form of the invention the structure comprises a number of substantially identical modules, each module being integrally cast from a cementitious material and comprising a number of the vanes joined together by cross members located at or adjacent the localities at which the respective zones at which the back portions and the frontal portions adjoin.

In another form of the invention the structure comprises a number of vanes joined together at their upper and lower ends by cross members.

It is an important advantage of the invention that at least one of the passages may be spanned by at least one cross vane located between the upper end and the lower end of the passage and dividing the passage into sub-passages.

BRIEF DESCRIPTION OF THE DRAWINGS

Various embodiments of the invention are discussed by way of example with reference to the accompanying drawings (which are drawn substantially to scale) and in which

FIG. 6 is a view similar to FIG. 1 of the block, i.e. the box frame with the vane assembly in place;

FIG. 7 is a side view of the block (in the direction of Arrow C in FIG. 6);

DETAILED DESCRIPTION OF THE EMBODIMENTS SHOWN IN THE DRAWINGS

Figure 5:
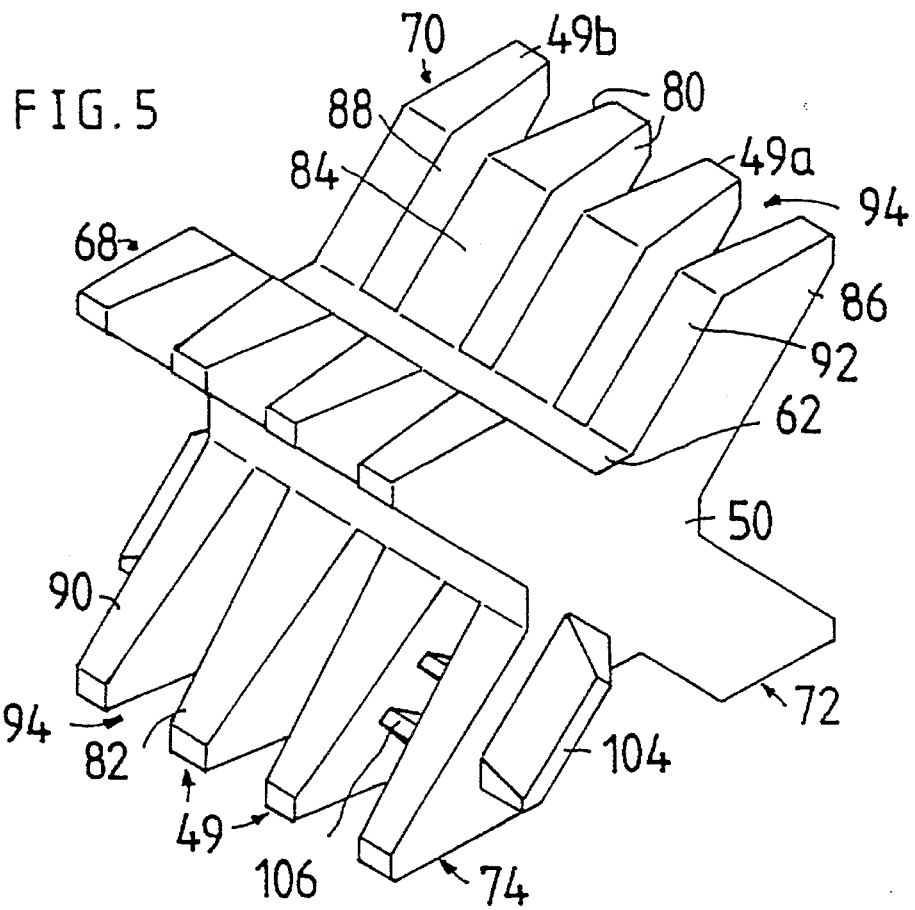
FIG. 5 is a perspective view of a vane assembly which is located in the box frame and is part of the block.

In FIGS. 1 to 9 inclusive there is shown a module 10 constructed of high strength cast cement or concrete. The module is of cubic form, being of one meter length, breadth and height. The module comprises a box frame in which there is located an assembly of vanes. For the sake of clarity the box frame is illustrated in FIGS. 1 to 4 with the vane assembly omitted and the vane assembly is illustrated in FIG. 5 separated from the box frame. In reality the module 10 is a one-piece casting with the vane assembly and the box frame integrally joined together. However applications of the present invention are also envisaged in which a module comprising a box frame without the vane assembly and a vane assembly which is not mounted in a box frame may be used. These will be described later.

Referring to FIGS. 1 to 4, the box frame comprises four legs 12, 14, 16 and 18 located along the vertical corner lines of the module. The legs are joined together at the back and front of the box frame by four transverse cross-members 20, 22, 24 and 26 located along the horizontal transverse corner lines of the module. The legs are also joined together by fore-and-aft cross members 28, 30, 32 and 34 located along the fore-and-aft corner lines of the module. The legs and the cross members define the boundaries of an approximately cubic space 36 located at the centre of the box frame.

The legs and transverse cross-members are substantially mutually identical. The legs 12, 14 and the transverse cross-members 20, 22 at the front of the module define a substantially square opening 38 communicating with the space 36. The legs 16, 18 and the transverse cross-members 24, 26 at the back of the module define an opening 40 which is substantially identical to the front opening 38 and also communicates with the space 36. Similar openings 42, 44, 46, 48 are defined at the ends and at the top and bottom respectively of the module. All of these latter openings communicate with the space 36.

The legs and cross-members are bevelled where the respective openings 38, 40, 42, 44 intersect the front, back, upper and lower faces of the box frame.

The space 36 is occupied by the aforementioned vane assembly comprising rows of vanes 49 projecting from a common, transversely disposed hub 50 located at the axial centre of the space 36. The hub has the cross-sectional shape of a diamond with four wide faces 52, 54, 56, 58 of equal length disposed at right angles one to the other. The corners of the diamond are however cut off to form four narrow flat faces 60, 62, 64, 66. It will be noted that the wide faces are disposed at 45° to the horizontal whereas the narrow faces are disposed, two horizontally and two vertically.

The vanes incorporated in the modules 10 are cruciform, having arms disposed in four rows 68, 70, 72, 74 of the vanes. One row radiates from each wide face of the hub. The rows are substantially mutually identical so that only one row will be described. Each row comprises four arms including two inner arms 49a located between two outer arms 49b. Each inner arm comprises two substantially identical symmetrically divergent side faces 80, a narrow front face 82 and a wide back face 84. The inner arms are thus symmetrically tapered from front to back. Each outer arm comprises an outer side face 86 which is substantially parallel to the side faces of the module and an inner side face 88 which diverges from the outer face 86. In addition each outer arm comprises a narrow front face 90 and a wide back face 92. The vane arms are shaped and positioned so that their front faces and back faces lie in spaced substantially parallel planes disposed at 45° to the bottom of the module.

Mutually identical passages 94 are defined between each adjacent pair of vane arms. The passages taper inwardly from front to back due to the divergence of the side faces of the vane arms. The wide front openings to the passages between the vane arms in the front rows 68, 74 face what will be called a front chamber 96 occupying part of the space 36 adjacent the front opening 38 of the module. Similarly the wide front openings to the passages between the vane arms in the back rows 70, 72 face a back chamber 98 adjacent the back opening 40 of the module. The narrow back openings of the passages between the vane arms in the upper rows 68, 70 face an upper chamber 100 adjacent the upper opening 46 of the module. Similarly the narrow back openings of the passages between the vane arms in the lower rows 72, 74 face a lower chamber 102 adjacent the lower opening 48 of the module. The ends of each chamber 96, 98, 100, 102 communicate with the respective side openings 42, 44 of the module.

It may be noted that the vane assembly and indeed the entire module is symmetrical about both a vertical plane and a horizontal plane through the central longitudinal axis of the hub.

Figure 9:
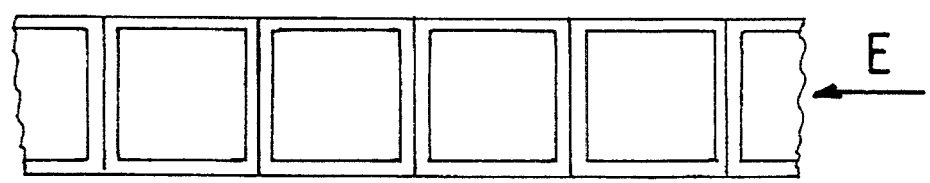
FIG. 9 is a somewhat schematic plan view of a row of the blocks placed end to end.

In perhaps the simplest example of use, as shown in FIG. 9, a row of the modules 10 is placed end to end on or adjacent a shore which is subject to storm damage. The row extends transversely to the direction in which waves approach the shore, the front of each module facing seawards. The size of the modules is selected so that the highest average wave expected in storm conditions reaches the top of the row of modules. It may be noted that in calm weather conditions the modules would for most purposes therefore project partially or wholly above mean sea level. However, the modules may also be used, for example, for construction of a breakwater in which case a number of the modules may be permanently submerged.

The modules are designed so that the hub 50 presents a wedge shaped face to the waves impinging on the front, back, top or bottom thereof. The flow from any of these directions is thus in varying degrees divided into opposed streams transverse to the original direction of flow. Furthermore the flow is directed in the main through the passages 94 between the vane arms. Because of the wedge shape of the vane arms and hub the passages are convergent and act as venturi to water flowing therethrough from the front or the back of the module, these being the directions from which the waves of highest energy will normally impinge on the modules. In the case of flow into the front of the unit, the water is forced through the venturi in the upper and lower rows 68, 74 of vane arms at the front of the module. The flow through the passages is thus first accelerated and then decelerated. At the same time the flow is split into opposed streams in both the vertical and horizontal planes; i.e. there is some flow towards each side and downwards although the bulk of the flow will be directed upwards. The effect of the venturi is that the module presents an energy dissipating permeable barrier which minimises reflection and generates turbulent flow predominantly towards the surface.

This action is repeated as a wave flowing from seaward continues to flow through the passages in the upper and lower rows 70, 72 of vane arms at the back of the module. The action also redirects the flow lines of a wave field and slows the velocity thereof. (A wave field is defined as the whole body of water between two positions of reference).

This action is duplicated in varying degrees in the case of flow from landward into the back of the module; as well as in the case of uplifting and downfalling flow.

Water flow through the unit forms vortices on the rear sides of the vane arms, hub and the components of the box frame which introduces aeration into the water, assisting with energy dissipation. However, entrapment of air within the module is precluded thus preventing pressurization.

Figure 12:
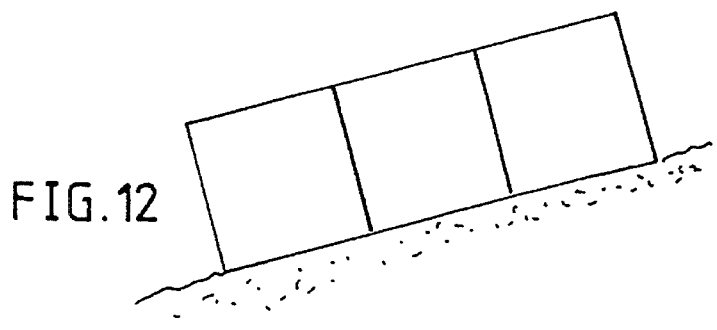
FIGS. 11 and 12 are side views, similar to FIG. 10, of two composite rows of the blocks.
Figure 11:
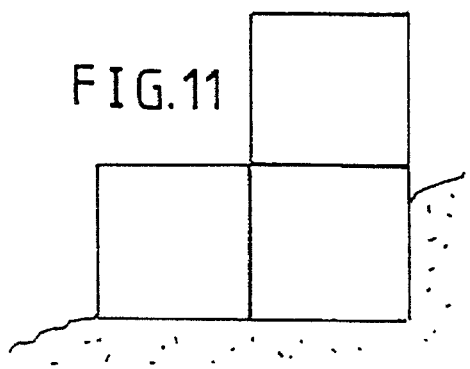
Figure 10:
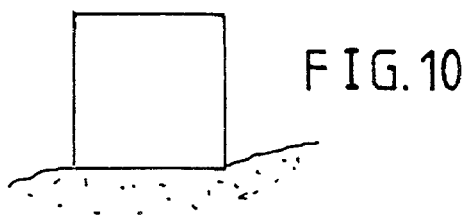
FIG. 10 is a side view of the row of blocks (on Arrow E in FIG. 9)

The modules are also designed to be placed in multiple adjacent rows. For example, three rows side by side are shown in FIG. 12. Two rows side by side with a further row placed on top of the landward row are shown in FIG. 11. In such cases, the V-shaped chambers 96, 98, 100, 102 at the front and back of each row of vane arms directs the flow from adjoining modules into collision course creating further turbulence and promoting energy dissipation. Water is caused to rise through the top of the weatherward module and then falls into the leeward module creating a repeating lifting and dropping cycle in an incoming wave as it moves through successive modules.

This uplifting effect can be increased if necessary by the provision of secondary wedge vanes in the lower rows of vanes 49 which will further restrict downward flow and promote upward flow. In the example shown in FIG. 5, secondary wedge vanes are shown at 104 on the outer faces of the vane arms 49b in one row (which would usually but not necessarily always be the lower front row) only; and at 106 in one of the passages between a pair of vane arms in the same row. Such secondary wedge vanes 106 would normally (but again not necessarily always) be placed between the lower vane arms of each pair of vanes 49. Only one pair of such vanes 106 is shown for the sake of illustration. The secondary wedge vanes between the vane arms in the front and back rows are also useful to reduce bottom scour when the modules are placed on a sediment base. The secondary wedge vanes are particularly applicable to placement on the lower rows of vane arms of large modules for use in relatively placid sea conditions.

Flow is also directed sideways through the units with energy dissipation once again being induced by turbulence and vortices created by movement across the vane faces and the components of the box frame itself.

One of the most significant characteristics of the modules 10, and in particular of the vanes incorporated therein, is the provision of the chambers which are defined by the rows of vane arms and which are presented to waves impinging on the modules. The chamber 96 is the most important of these chambers since this is the chamber which is presented to waves approaching the shore, these ordinarily being the waves of highest kinetic energy. The chamber 96 is, in essence, defined by the pair of seaward facing rows 68, 74 of vane arms and in particular by the frontal or seaward facing parts thereof. These vane arms are inclined from the vertical so that the outer ends of the faces 82, 90 are further seaward (i.e. are further from the shore) than their inner ends adjacent the hub 50. The chamber 96 thus helps to entrap water which flows into it from seaward, forcing it to pass through the passages 94 rather than reflecting it upwardly over the top of the module or directly back to sea.

It is believed that a module incorporating a seaward facing chamber only would have substantial utility. However, the other chambers 98, 100, 102 (particularly 98), which function in the same way for waves approaching from different directions, are believed to enhance the utility of the module.

The faces 82, 90 of the vane arms 68, 74 (and the corresponding faces of the other vane arms) need not be flat. They are made so primarily because of ease of manufacture and strength considerations. They could, for example, be rounded or V-shaped; however in the latter event they would probably be susceptible to damage in service.

Figure 18:
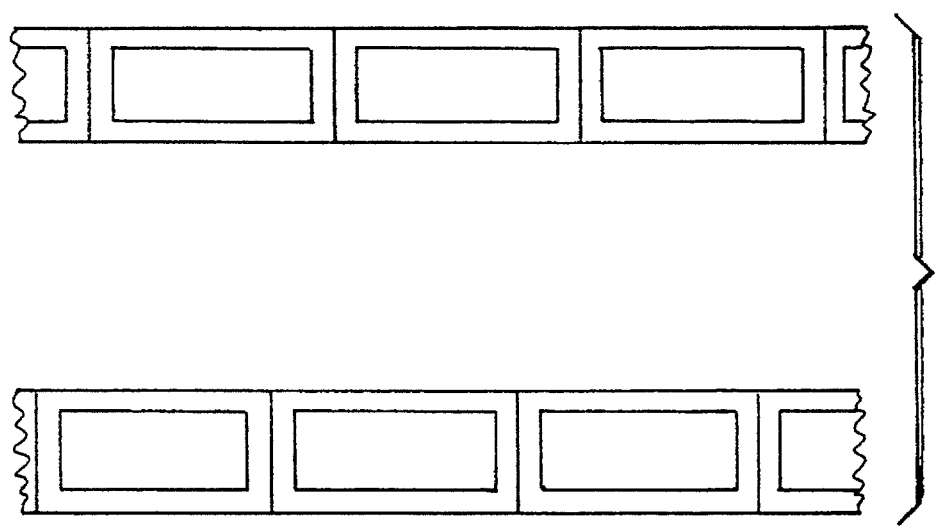
FIG. 18 is a schematic plan view of two rows of modified blocks erected in a lagoon.

A one meter size module as shown weighs approximately 1 tonne. Larger modules may be constructed simply by scaling up the smaller module shown in the drawings. Of course, modules having other proportions may also be constructed. For example, tests are presently being carried out on modules 2 meters long×1 meter wide×1 meter high. Modules of these proportions are shown schematically in FIG. 18. It is reckoned that a module of 3 meters height, length and depth would weigh about 26 tonnes and could be suitable for hurricane (cyclone) conditions.

Computer models have been developed for predicting sea conditions, including wave heights, in places where the ground topography adjacent a shore line is known. Such a computer model developed for the United States Army has been applied to a chosen locality in a lagoon (i.e. between a fringing reef and the shore) on the island of Rarotonga in the Cook Islands. A first exercise was carried out with the object of ascertaining the effect of placing in this locality a structure comprising modules of the present invention during a severe cyclone. The results indicate that a structure consisting of two adjoining rows of modules of 3×3×3 meters size would reduce the average height of an incident wave from 3.17 meters to 0.51 meters. The structure was assumed to be elevated above base level so that the tops of the modules were level with the tops of the waves. In a second exercise the two rows of modules were separated by a distance of 10 meters. In this case the height of a 3.17 meter incident wave was reduced to 0.37 meters, i.e. a reduction of 89%.

It was necessary to make a number of assumptions in these exercises so that the results will need to be verified by tests in use.

It is thought that the relatively small further reduction in average wave height brought about by the second structure is due to the fact that the waves impinging on the second structure have substantially less energy than those impinging on the seaward structure. Consequently the size of the venturi of the second structure is too large for optimum further wave height reduction. An advantage of the present invention is that the venturi size can be varied after placement of the modules by installation of suitable secondary vanes 106.

Figures 13, 14:
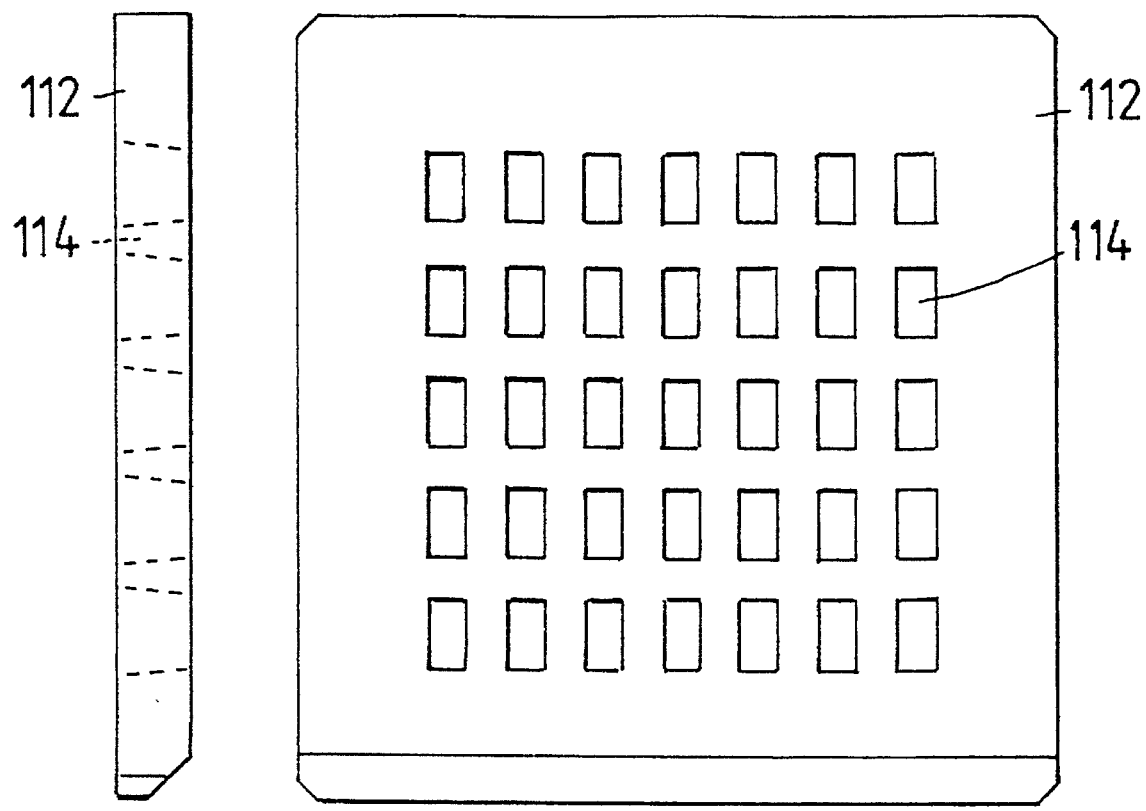
FIGS. 13 and 14 are plan and side view respectively of a plate for use in conjunction with the modules.
Figure 15:
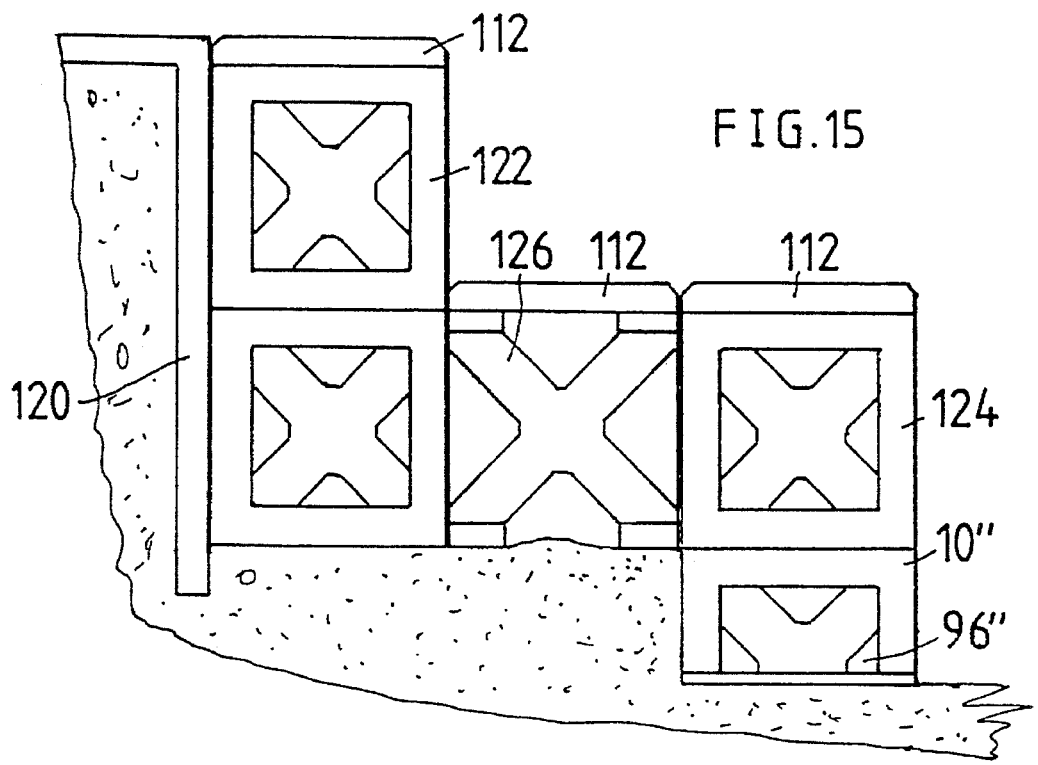
FIG. 15 is a side view of a construction showing the blocks erected next to a sea wall.

A further advantage of the design is that concrete plates as shown at 112 in FIGS. 13 and 14 can be used in conjunction with the modules. A plate can placed on top of each module in a row to provide a walkway along the construction. This, and the ability to stack the modules enables structures of the modules to be used for a variety of recreational and utilitarian purposes incidental to their primary function. For example, the structure may incorporate a deck, a stairway, a multi-layered promenade or a jetty. An example is shown in FIG. 15 where the modules are used to protect a sea wall 120 in storm conditions. A first row 122 of the modules 10, stacked two high, is located against the sea wall 120. The top of the first row is level with the top of the sea wall and thus with the adjacent side walk and road. A second row of modules is shown at 124, spaced from the first row 122. A row of modified vanes 126, described further below, is located between the rows 122, 124. Plates 112 are placed on the modules in each row. The plates on the two outer rows can be used as a second promenade below the sidewalk.

Alternatively, the plates can be placed underneath the modules to act as a permeable base; against the backs of the modules where they are placed for ground retention; or against the ends of the modules, particularly those at the ends of a row. Tapered passages 114 are cast into the plates to allow water to pass therethrough.

The vanes 126 are spaced further apart than the vanes 94 in a module 10. For example only three vanes 126 may be provided per unit length of a module 10. Viewed in the axial direction, the profile of the vanes 126 is, in the present example, substantially similar to that of the vanes 49. However, because the vanes 126 are so widely spaced there may be no advantage to providing them with tapered side faces. There is also no hub between the vanes. Although two or more vanes 126 may be integrally cast as a single module, it will usually be convenient to cast each vane 126 separately and to mount it on spaced concrete slabs 128. After placement of the vanes, capping beams 130 may be mounted thereon. The plates 112 are supported on the beams 130.

The techniques for casting the slabs 128 and for joining the vanes to the slabs 128 and beams 130 (as by adhesive) are known and need not be described here.

The use of vanes 126 as described has a number of advantages. They reduce side flow velocity in the space between the rows 122 and 124. They facilitate the erection of a curved structure which follows a natural shoreline. Their profile, end on, can be made to correspond to that of the vanes 49.

Hollow blocks comprising a box frame as shown in FIGS. 1 to 4 without any vanes 49 could be used instead of the vanes 126.

FIG. 15 also shows the use of half modules 10". As will be clear these are identical to a module 10 sliced through its centre in a horizontal plane. The half-module 10" is preferably mounted on a plate such as a plate 112. The half-module 10" also has entrapment chambers including chamber 96" facing the sea and functioning in the same way as the chamber 96 of the module 10. In the construction shown in FIG. 15 the half-module is used on a beach of moderate slope to support the module 10. The top of the module 10 is thus raised level with the top of the lower module 10 in the row 122.

A half-module (not shown) can also be produced which is identical to a module 10 sliced through its centre in a vertical plane.

It will be understood that the the ability to vary the size and shape of the modules used for the purposes contemplated herein will be quite severely limited by cost considerations. It is thus an advantage to be able to produce from a single mould half-modules having the operational advantages of the full size modules.

Figure 17:
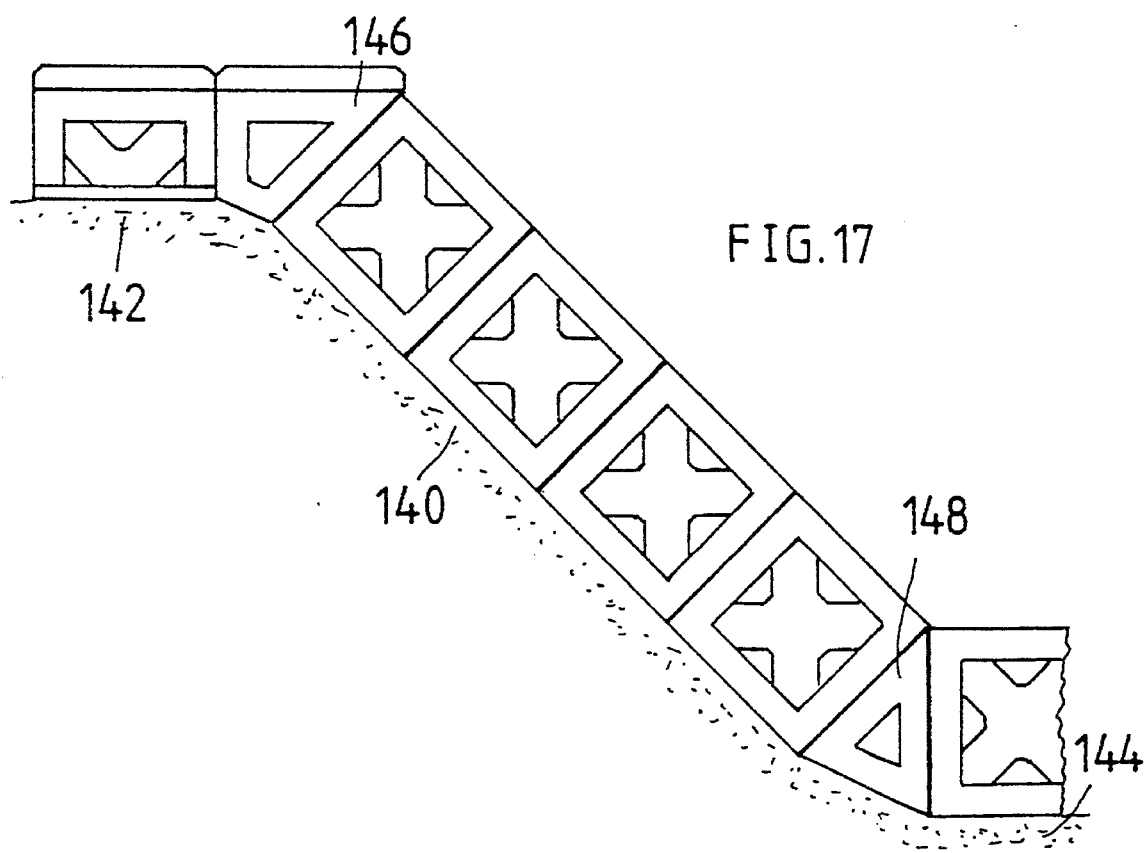
FIG. 17 is a side view of a construction showing the blocks erected on an inclined shore.

In FIG. 17 rows of the modules 10 are laid along a section of shore comprising a steeply sloping portion 140 between two horizontal portions 142, 144. Specially shaped hollow blocks 140, 142 are used to interface the modules 10 laid on the sloping portion 140 with the half-modules laid on the portion 142; and with the modules 10 laid on the portion 144.

Figure 16:
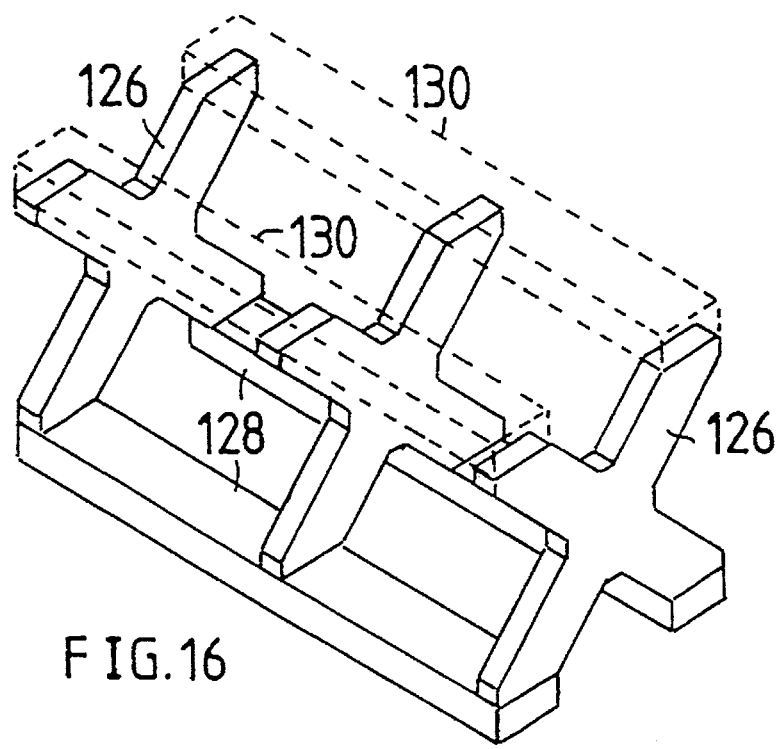
FIG. 16 is a perspective view of a modified block used in the construction shown in FIG. 15.

As already foreshadowed herein, a module could be produced in which certain of the legs or cross beams of the box frame are omitted. For example, the legs 12, 14, 16, 18 may be omitted for a module which is subject to less stress in use than the module 10. This would result in a module similar to what is illustrated in FIG. 16 but having more vanes and with the slabs and beams forming an integral part of the module as cast. The arms of such vanes would also advantageously be tapered as already described. In an extreme case the entire box frame could conceivably be omitted so that the module thus arrived at would comprise a vane assembly similar to that illustrated in FIG. 5.

Figure 19:
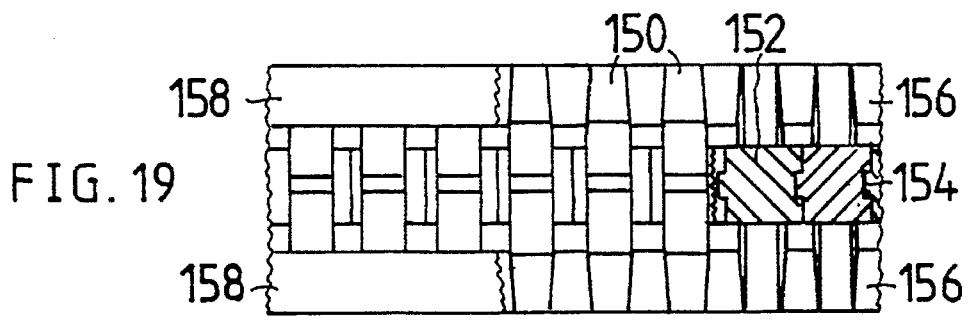
FIG. 19 is a plan view, partly in section, of a number of individually produced vanes erected to form a wave energy dissipating structure.

It may be advantageous to cast the vanes individually, especially where they are very large. In this case, as illustrated in FIG. 19, the vanes may incorporate tapered arms 150 substantially similar to those of the vanes 49. The vanes may also incorporate hub portions 152 having interlocking formations 154 as shown in the sectioned part at the right of FIG. 19. The vanes are erected consecutively on pre-laid slabs 156 and fixed thereto. After erection of the vanes beams 158 are laid across the tops thereof and fixed thereto. In this construction substantially the entire row of vanes forms a monolithic unit with the slabs and the beams.

Figure 20:
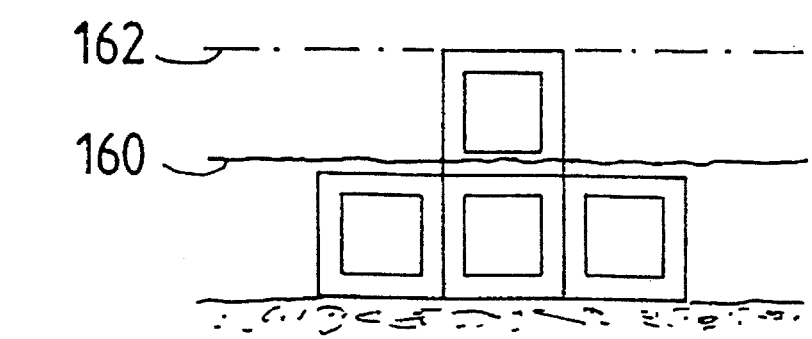
FIG. 20 is a schematic side view of a construction showing the blocks used to form a breakwater.

An example of use of the modules 10 for a breakwater is shown in FIG. 20. The ordinary water level is shown at 160 so that the modules at the bottom of the breakwater are more or less permanently submerged. The height of the breakwater would be not less than the expected maximum water level, indicated at 162.

Figure 2:
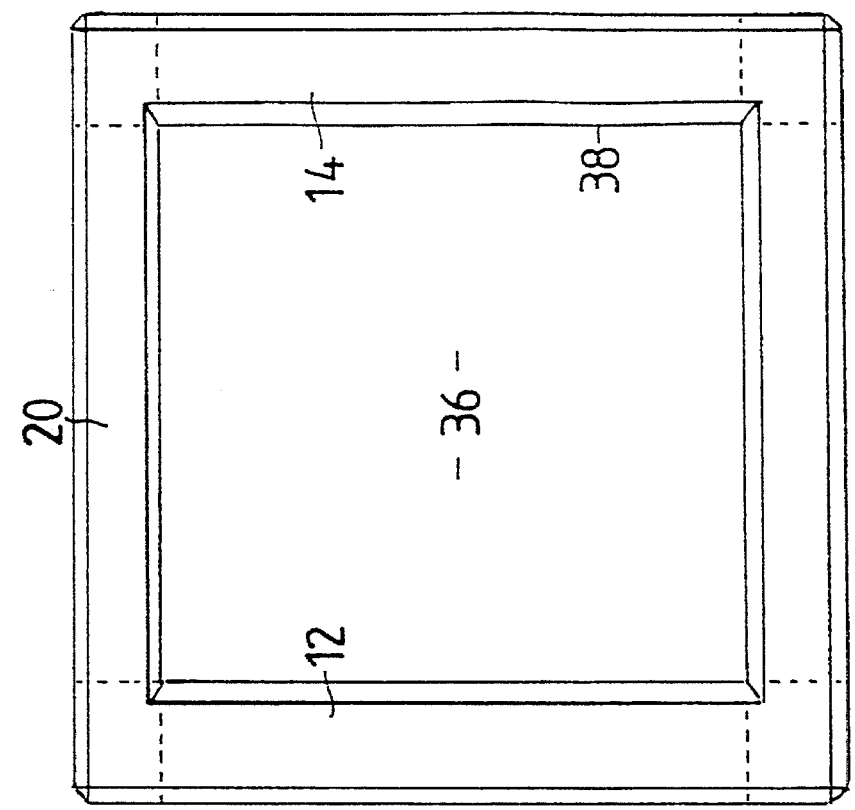
FIG. 2 is a view on the front face of the box frame (in the direction of Arrow A in FIG. 1)
Figure 1:
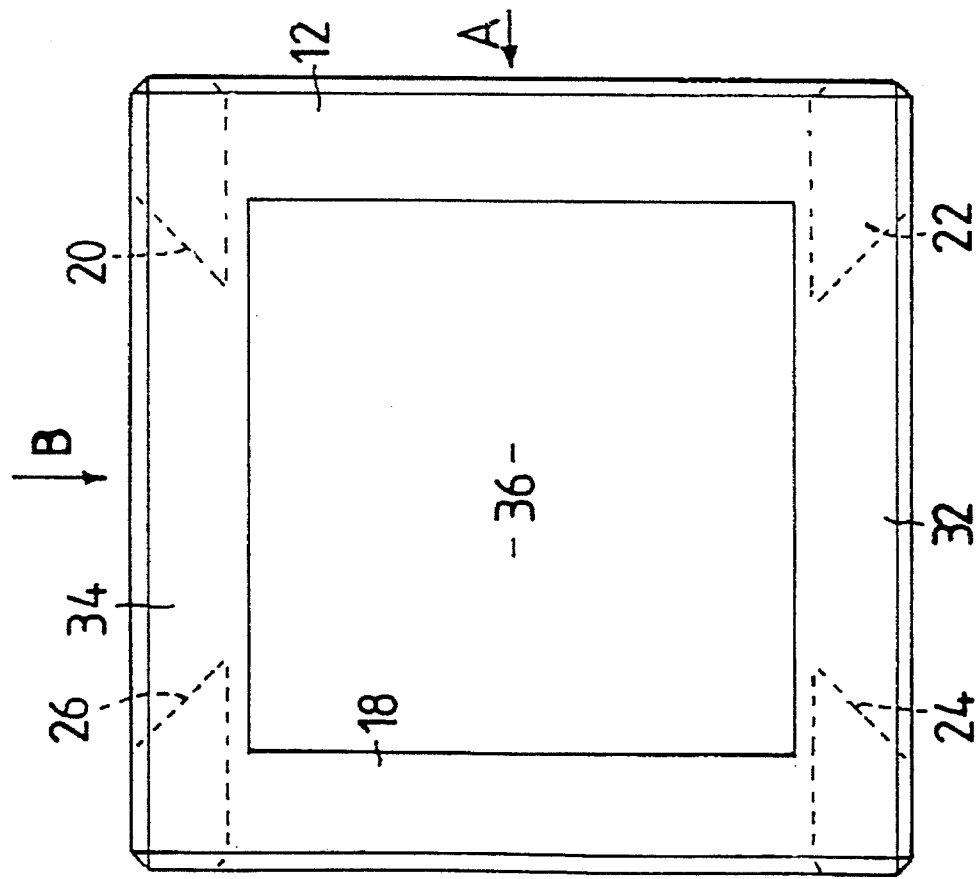
FIG. 1 is an end view of a box frame which is part of one of a series of mutually identical blocks intended to be placed adjacent a shore line for the purpose of dissipating the energy of waves impinging on the shore.
Figure 8:
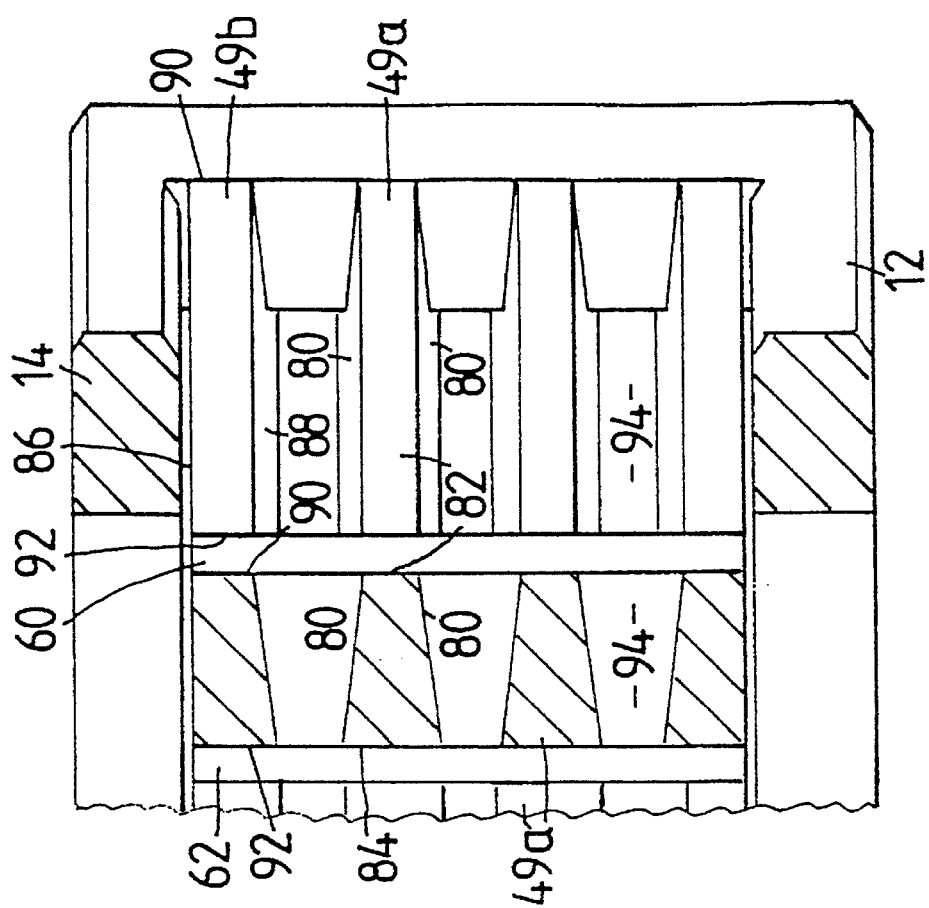
FIG. 8 is a cross-sectional view of part of the vane assembly (on Arrows D—D in FIG. 6)
Figure 3:
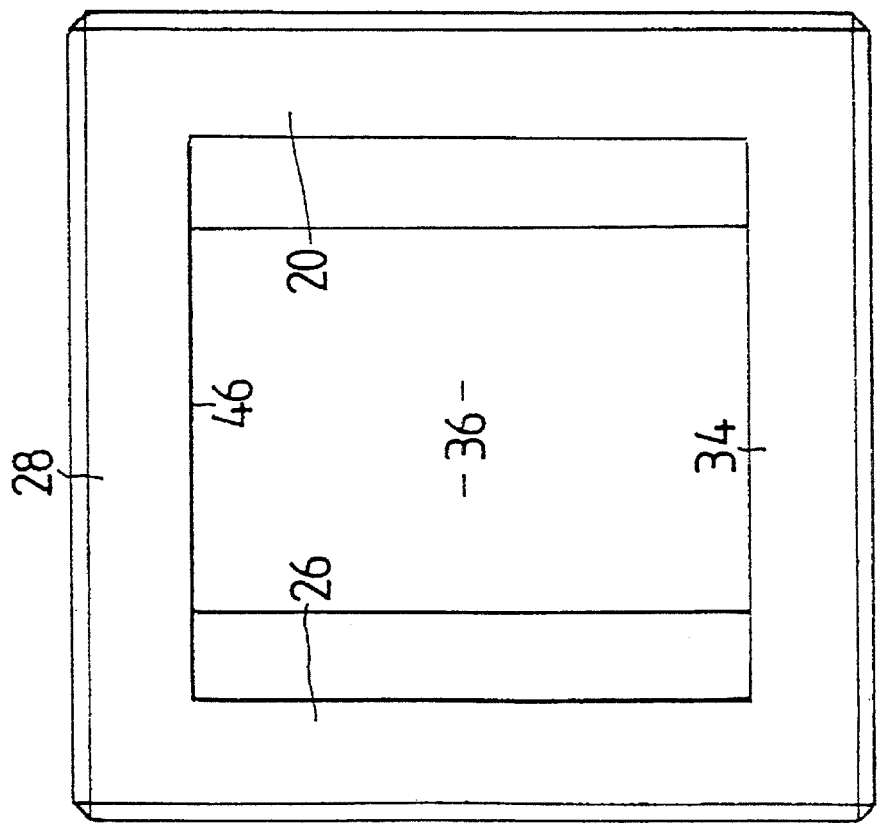
FIG. 3 is a view on the top face of the box frame (in the direction of Arrow B in FIG. 1)
Figure 4:
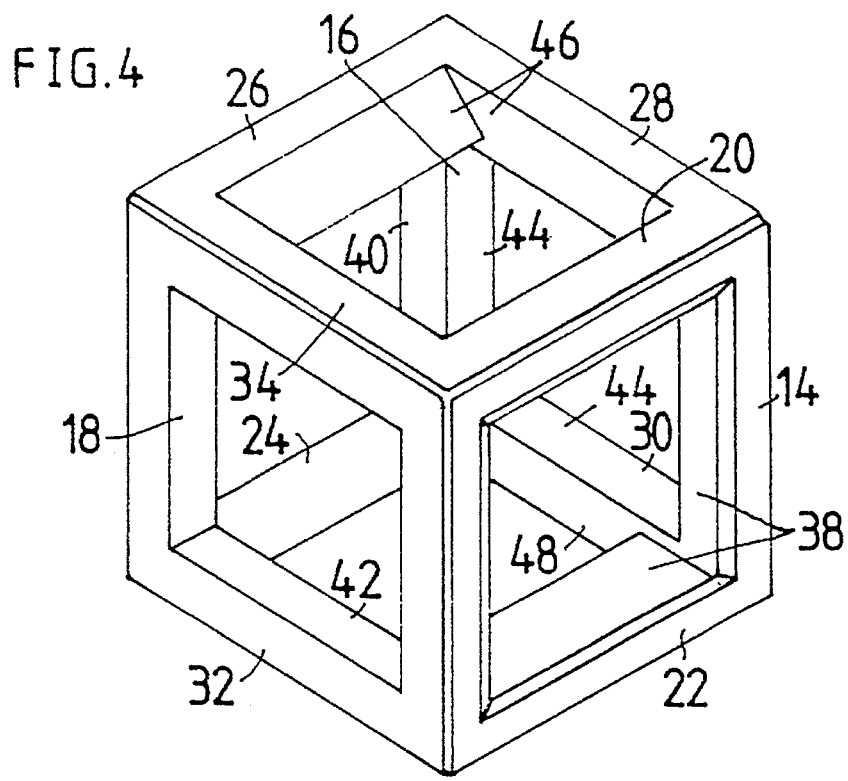
FIG. 4 is a perspective view of the box frame.
Figure 21:
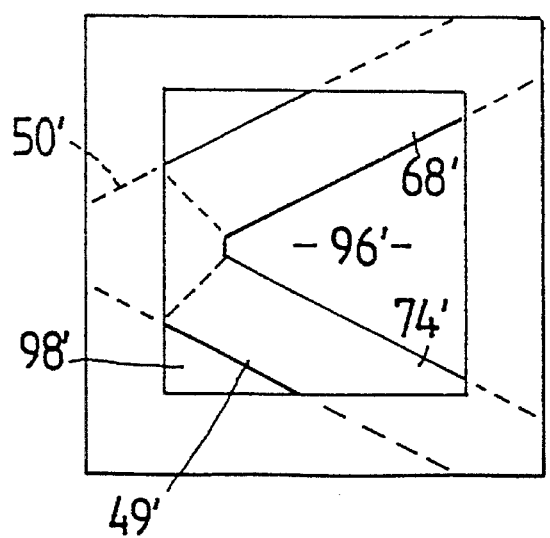
FIGS. 21 and 22 are side views of two modified blocks.

FIG. 21 shows a module with vanes having two seawardly inclined rows 68', 74' of tapered arms so that the vanes are of horizontal V-shape. The module has a hub indicated at 50'. A seaward facing entrapment chamber is indicated at 96'. There is also a landward facing entrapment chamber indicated at 98'.

Figure 22:
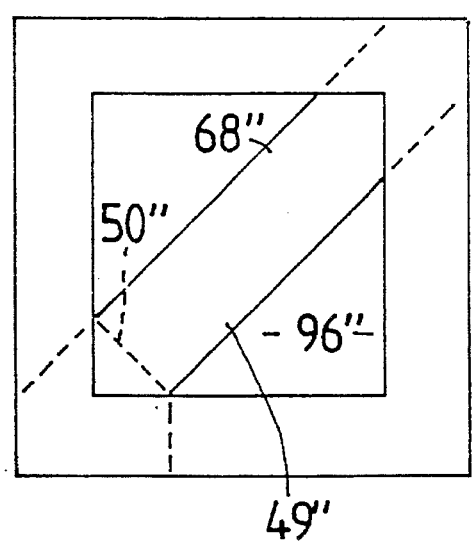

In FIG. 22 the module has vanes comprising a single seawardly inclined row 68" of tapered arms and a hub 50". There is a single entrapment chamber 96" which is seaward facing.

It is not intended that the scope of a patent granted in pursuance of the application of which this specification forms a part should exclude modifications and/or improvements to the embodiments described and/or illustrated which are within the scope of the claims or be limited by details of such embodiments further than is necessary to distinguish the invention from the prior art.

I claim:

1. A structure for dissipating the energy of waves impinging on a shore, the structure comprising a number of similarly shaped, spaced apart, upwardly disposed vanes positioned in at least one row on the floor of a body of water adjacent the shore so that passages for the waves are defined between at least some pairs of adjacent vanes, CHARACTERISED IN THAT each passage has an entrance facing away from the shore and an exit facing the shore;

sidewalls defined by the vanes which sidewalls converge from the entrance to the exit;

and a lower cross wall, at least a portion of which slopes upwardly from the entrance to the exit.

2. A structure according to claim 1, CHARACTERISED IN THAT each vane has a frontal portion at least part of which comprises a zone which faces away from the shore and a back portion at least part of which comprises a zone which faces the shore, each zone being inclined from the vertical so that an upper end of the zone is located further from the shore than a lower end thereof CHARACTERISED IN THAT the entrance is at least partly bounded by the frontal portions of the vanes and the exit is at least partly bounded by the back portions of the vanes, the back portions being wider than the front portions so that the passage is narrower at the exit than at the entrance.

3. A structure according to claim 1, CHARACTERISED IN THAT the frontal portion comprises an upper zone which adjoins a lower zone, each of the zones being inclined from the vertical with the upper end of the upper zone and the lower end of the lower zone being further from the shore than the locality at which the zones adjoin.

4. A structure according to claim 3, CHARACTERISED IN THAT each vane has a back portion comprising an upper zone which adjoins a lower zone, each of the zones facing the shore and being inclined from the vertical with the upper end of the upper zone and the lower end of the lower zone being further from the shore than the locality at which the zones adjoin.

5. A structure according to claim 4, CHARACTERISED IN THAT each vane is substantially cruciform, being substantially symmetrical about a vertical plane through its centre.

6. A structure according to claim 4, CHARACTERISED IN THAT it comprises a number of substantially identical modules each module being integrally cast from a cementitious material and comprising a number of the vanes joined together by cross members located at or adjacent the localities at which the respective zones at which the back portions and the frontal portions adjoin.

7. A structure according to claim 1, CHARACTERISED IN THAT it comprises a number of vanes joined together at their upper and lower ends by cross members.

8. A structure according to claim 1, CHARACTERISED IN THAT at least one of the passages is spanned by at least one cross vane located between the upper end and the lower end of the passage and dividing the passage into sub-passages.

* * * * *